Aug. 19, 1958  J. D. WADDELL  2,848,232
TOY FISHING APPARATUS
Filed Nov. 13, 1956  2 Sheets-Sheet 1

INVENTOR:
JOE D. WADDELL.
BY Eaton, Bell, Hunt & Seltzer
ATTORNEYS

Aug. 19, 1958  J. D. WADDELL  2,848,232
TOY FISHING APPARATUS
Filed Nov. 13, 1956  2 Sheets-Sheet 2
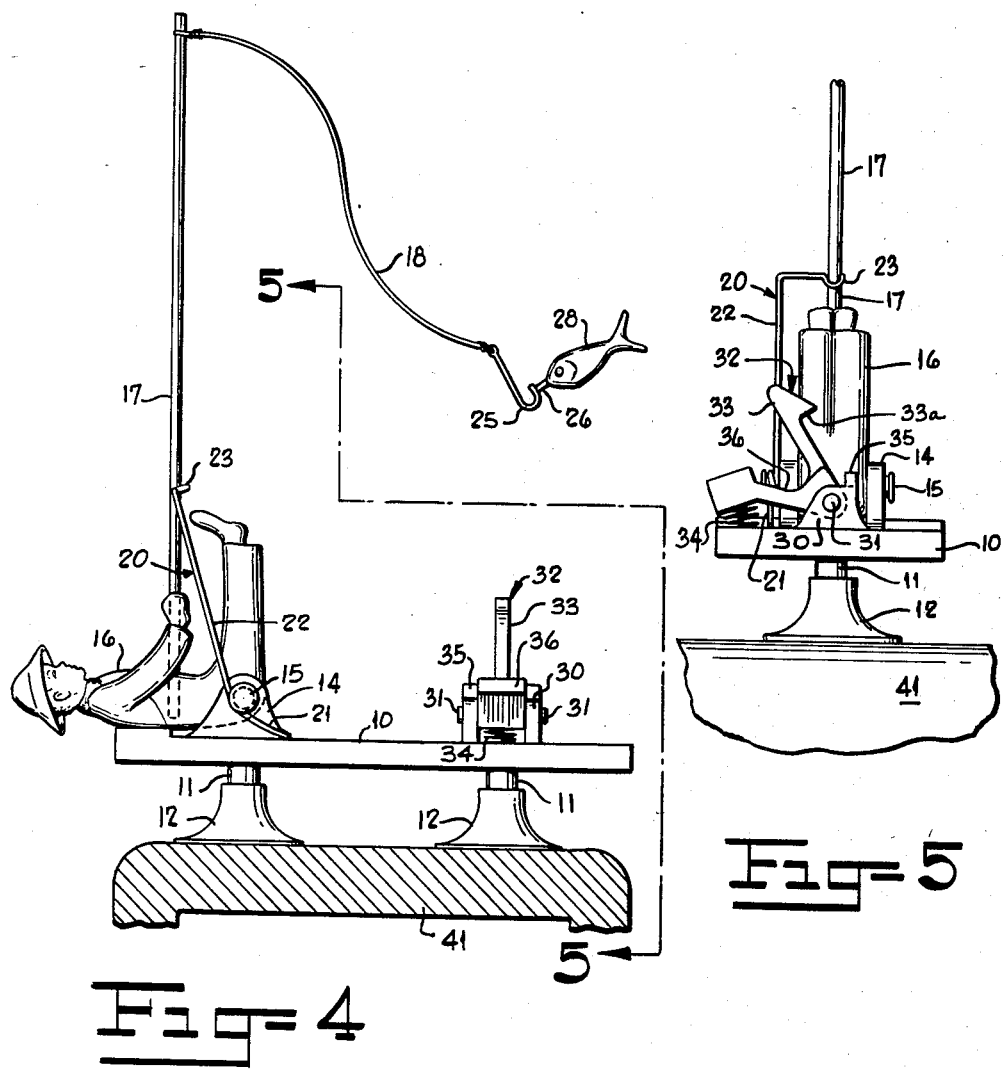
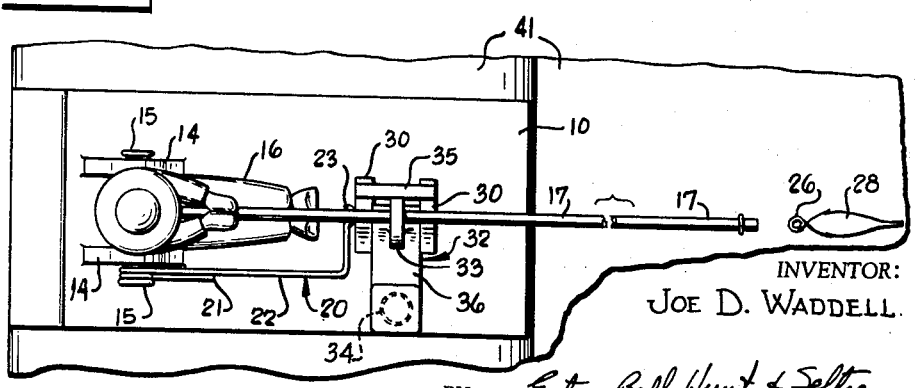
INVENTOR:
JOE D. WADDELL.
BY Eaton, Bell, Hunt & Seltzer
ATTORNEYS United States Patent Office 2,848,232
Patented Aug. 19, 1958

2,848,232

TOY FISHING APPARATUS

Joe D. Waddell, Charlotte, N. C., assignor to Waddell Construction Company, Inc., Charlotte, N. C., a corporation of North Carolina Application November 13, 1956, Serial No. 621,812

2 Claims. (Cl. 273—1)

This invention relates to a toy fishing apparatus which is preferably to be used in bathtubs, sinks, lavoratories or the like, or any water holding device having a platform on which the device can rest. It is quite evident that the apparatus could be installed on any other device and may even be held in the hand while a vessel such as a bucket of water could be used in association with the fishing line and hook.

It is an object of this invention to provide a toy fishing apparatus which has a hook on one end of the line and one or more toy fish which are placed in or floated on the water having a means integral therewith whereby when the fish comes close to the hook, the operator can press a lever to release the pole so that the pole will be raised quickly and pull the hook and fish upwardly out of the water.

It is another object of this invention to provide a toy fisherman provided with a fishing pole and line and hook which is normally urged upwardly by spring means to raise the hook out of the water but which has spring pressed holding means for holding the pole downward so that the hook will be submerged in the water. When the fish moves to the proper position, the spring pressed holding means can be released to allow the toy fisherman to pivot quickly on its seat and the pole, hook and line will be raised upwardly by the spring means to bring the fish out of the water.

Some of the objects of the invention having been stated, other objects will appear as the description proceeds when taken in connection with the accompanying drawings, in which—

Figure 4 is a view similar to Figure 1 but showing the hook withdrawn from the water and the fisherman tilted as in the act of catching a fish;

Figure 5 is a front elevation taken along the line 5—5 in Figure 4;

Figure 6 is a top plan view of Figure 1.

Figure 1:
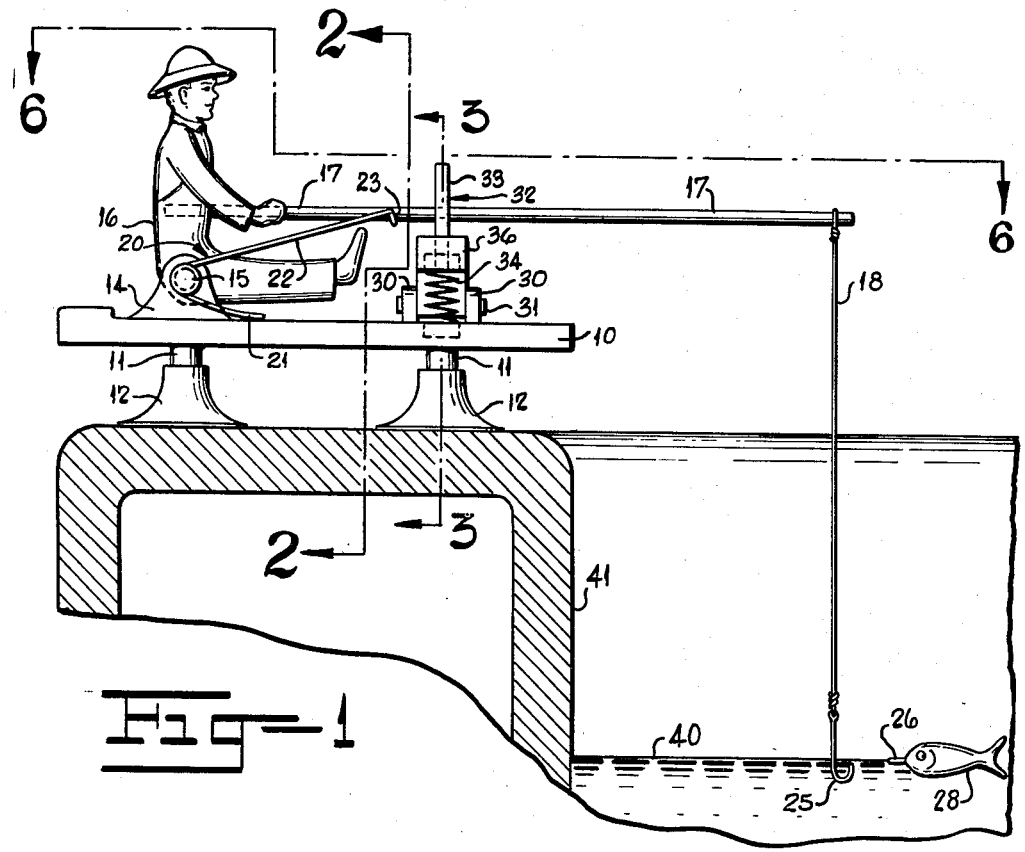
Figure 1 is a side elevation of the fishing apparatus showing the bathtub or the like to which the fishing apparatus is attached partially in cross-section.
Figure 2:
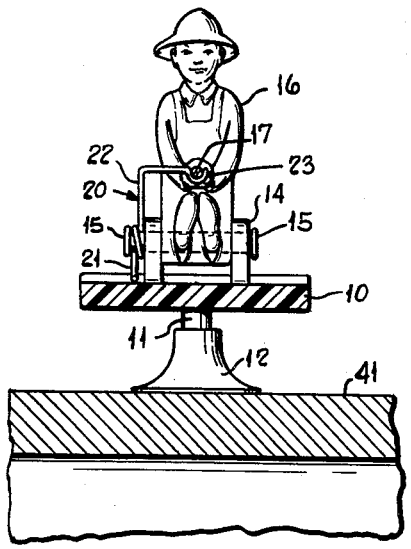
Figure 2 is a vertical sectional elevation of the apparatus mounted on the tub or the like taken substantially along the line 2—2 in Figure 1.

Referring more specifically to the drawings, the numeral 10 indicates a base or platform having integrally formed downwardly projecting portions 11 on which are fixed suitable support means such as vacuum cups 12. The platform 10 has, on its upper surface, a pair of upwardly extending spaced longitudinally extending lugs 14 with a pivot pin 15 extending between and oscillatably mounted therein. The pin 15 supports and penetrates the medial portion of a seated toy fisherman 16 having a pole 17, one end of which is embedded in the body of the fisherman 16 and supported adjacent the end by the hands and arms of the fisherman 16. The free end of the pole 17 extends outwardly beyond the front edge of the platform 10 and has one end of a flexible cord or fishing line 18 fixed thereto.

Around one end of the pin 15 is secured the torsion part of a spring 20 which has a leg 21 pressed against the platform 10 and another leg 22 being bent substantially U-shaped as at 23 to partially encircle the lower side of the pole 17. The lower end of the line 18 has affixed near the end thereof a hook 25 which may be magnetized and which is at times adapted to engage a ring 26 which may be magnetized and which is integral with the front end of a toy fish 28 (Figures 1 and 6).

The front end of the platform 10 has a pair of upstanding lugs 30 mounted thereon and in which a pin 31 is mounted and on which is oscillatably mounted a dog or latch 32 having a leg 33 provided with a hook or shoulder portion 33a adapted to be hooked over the pole 17 to hold the same in lowered position. A compression spring 34 has its lower end mounted in a depression in the platform 10 and its upper end mounted in a depression in the lower side of an arm 36 of the dog 32. A transversely extending stop bar 35 (Figures 3, 5 and 6) extends between the lugs 30 and is provided to limit movement of the dog 32 when it is not engaged with the pole 17.

Figure 3:
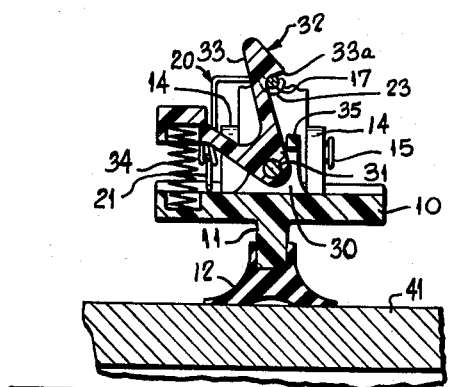
Figure 3 is a vertical sectional view taken along the line 3—3 in Figure 1.

It is thus seen that with the parts in the position shown in Figures 1, 3 and 6, that the pole 17 will be held in lowered position by the shoulder portion 33a of the dog 32. There can be several toy fish 28 floating on water indicated at 40 disposed in a suitable vessel indicated at 41 and suitable agitating means can be employed such as a stick or the like to cause the fish 28 to move around and when one of the magnetized rings 26 is moved near the magnetized hook 25, the operator can depress the arm 35 and move the dog 32 to the position shown in Figure 5. The shoulder portion 33a will be disengaged from the pole 17 to release the pole 17 to cause the hook 25 to lift the ring 26 and thus "catch" the fish 28. The fish 28 will be withdrawn quickly by the spring 20 after release of the holding dog 32 and the parts will assume the position shown in Figure 4. Of course the fish 28 can be removed from the hook 25 and the parts again reset to the position shown in Figure 1 for a repeating of the operation.

The toy fish 28 is preferably made of plastic or the like so as to float partially on the surface or at least adjacent the surface of the water or other medium 40. And although throughout the specification it is stated that the hook 25 and the ring 26 in the fish 28 are both magnetized, it is to be understood that it is possible to "catch" the fish 28 if only the hook 25 or the ring 26 is magnetized. Also, the game could be played if neither the hook 25 nor the ring 26 were magnetized by waiting until the open portion of the ring 26 floats over the hook 25 and releasing the dog 32 so that the point of the hook 25 would pass into the ring 26 and "hook" the fish 28.

It is thus seen that I have provided a toy fishing apparatus which can be used by young and old in a fishing game which will give much delight and help to develop the reflexes of the user.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a toy fishing apparatus including a platform, a toy fisherman pivotally mounted adjacent one end of the platform and provided with a pole extending from the toy fisherman across and above the platform and resilient means normally urging the toy fisherman and pole from a first position with the pole in lowered position extending across the platform to a second position with the pole in raised position extending upwardly above the platform at an angle approaching the vertical, latch means pivotally connected to the platform adjacent the pole when in lowered position and including a hook portion extending transversely across said lowered pole, and a compression spring extending between the platform and a portion of the latch spaced from the hook portion and said spring normally urging the hook portion of the latch across the pole to overcome said resilient means and hold the pole in said first position whereby upon said latch means being actuated to overcome the compression spring the hook portion on the latch will be moved away from the pole to permit said resilient means to move the pole and toy fisherman to said second position.

2. A structure according to claim 1 wherein the compression spring is partially recessed in the platform.

References Cited in the file of this patent

UNITED STATES PATENTS

| | | |
|---|---|---|
| 1,769,488 | Buschor et al. | July 1, 1930 |
| 2,625,396 | Frechtmann | Jan. 13, 1953 |

FOREIGN PATENTS

| | | |
|---|---|---|
| 63,828 | France | Apr. 27, 1955 |